(12) United States Patent
Ashlock et al.

(10) Patent No.: US 12,289,210 B2
(45) Date of Patent: Apr. 29, 2025

(54) SYNTHETIC PATH TRACING OF SEGMENT ROUTED NETWORKS

(71) Applicant: Cisco Technology, Inc., San Jose, CA (US)

(72) Inventors: Hans Ashlock, Berkeley, CA (US); Bruce Alexander McDougall, Anacortes, WA (US); Benjamin Haddox, East Dubuque, IL (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 18/225,788

(22) Filed: Jul. 25, 2023

(65) Prior Publication Data

US 2025/0039057 A1    Jan. 30, 2025

(51) Int. Cl.
*H04L 41/12* (2022.01)
*H04L 43/0829* (2022.01)
*H04L 43/087* (2022.01)
*H04L 43/12* (2022.01)

(52) U.S. Cl.
CPC .......... *H04L 41/12* (2013.01); *H04L 43/0829* (2013.01); *H04L 43/087* (2013.01); *H04L 43/12* (2013.01)

(58) Field of Classification Search
CPC ... H04L 41/12; H04L 43/0829; H04L 43/087; H04L 43/12
See application file for complete search history.

(56) References Cited

U.S. PATENT DOCUMENTS

| | | | |
|---|---|---|---|
| 9,369,371 B2 | 6/2016 | Filsfils et al. | |
| 11,336,569 B2 | 5/2022 | Arora et al. | |
| 2009/0028054 A1* | 1/2009 | Kumar | H04B 3/46 370/242 |
| 2011/0189440 A1* | 8/2011 | Appleby | B29C 33/38 523/435 |
| 2019/0260657 A1 | 8/2019 | Clarence et al. | |
| 2020/0162364 A1* | 5/2020 | Chhabra | H04L 43/0852 |
| 2022/0086078 A1 | 3/2022 | Sivabalan et al. | |
| 2022/0407800 A1 | 12/2022 | Chadha | |

OTHER PUBLICATIONS

"Jalapeno", online: https://github.com/cisco-open/jalapeno, accessed Jul. 25, 2025, 4 pages, Github.com.
Filsfils, et al., "Path Tracing in SRv6 networks", Internet Draft: draft-filsfils-spring-path-tracing-02, Aug. 16, 2022, 12 pages, IETF Trust.

(Continued)

*Primary Examiner* — Minh Chau Nguyen
(74) *Attorney, Agent, or Firm* — BEHMKE INNOVATION GROUP LLC; James M. Behmke; James J. Wong

(57) ABSTRACT

In one embodiment, a device obtains topology information for a segment routed network. The device generates, based on the topology information, segment routing label stacks to probe different paths between a source and destination in the segment routed network. The device conducts probing of the different paths during which synthetic probe packets are sent via the segment routed network using the segment routing label stacks. The device presents results of the probing of the different paths for display.

20 Claims, 12 Drawing Sheets

(56) References Cited

OTHER PUBLICATIONS

"SRV6 Traceroute Tool", online: https://github.com/vmag/srv6_tracert, accessed Jul. 25, 2023, 4 pages, Github.com.
Hou, et al., "An Optimization Routing Algorithm Based on Segment Routing in Software-Defined Networks", Sensors 2019, 19, 49, 21 pages, MDPI.

* cited by examiner

SYNTHETIC PATH TRACING OF SEGMENT ROUTED NETWORKS

TECHNICAL FIELD

The present disclosure relates generally to computer networks, and, more particularly, to synthetic path tracing of segment routed networks.

BACKGROUND

Telecommunication providers, Internet and cloud service providers, and enterprises that own their own networks are increasingly leveraging segment routing to provide more granular and efficient packet forwarding in core, metro, access, and cellular networks. In general, segment routing allows network operators to explicitly define what path a certain packet should take when being sent from a particular source to a particular destination. Doing so provides a powerful mechanism for granular network optimization and application specific traffic engineering, which is one of the primary goals of full stack observability and application centric networking.

In order to fully leverage the potential of segment routing, operators need to understand the end-to-end performance of the different network paths that will be used in a segment routed network. They also need to be able to understand the performance of individual hops within a segment routed path so that they can troubleshoot and modify segment routed paths that may be impacting application or service performance. However, traditional path probing techniques are based on Internet Protocol (IP) packets and routed using best path or Equal-Cost Multi-Path (ECMP) forwarding, meaning that the probe packets are only able to probe the path chosen by the underlying routing protocol.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains topology information for a segment routed network. The device generates, based on the topology information, segment routing label stacks to probe different paths between a source and destination in the segment routed network. The device conducts probing of the different paths during which synthetic probe packets are sent via the segment routed network using the segment routing label stacks. The device presents results of the probing of the different paths for display.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
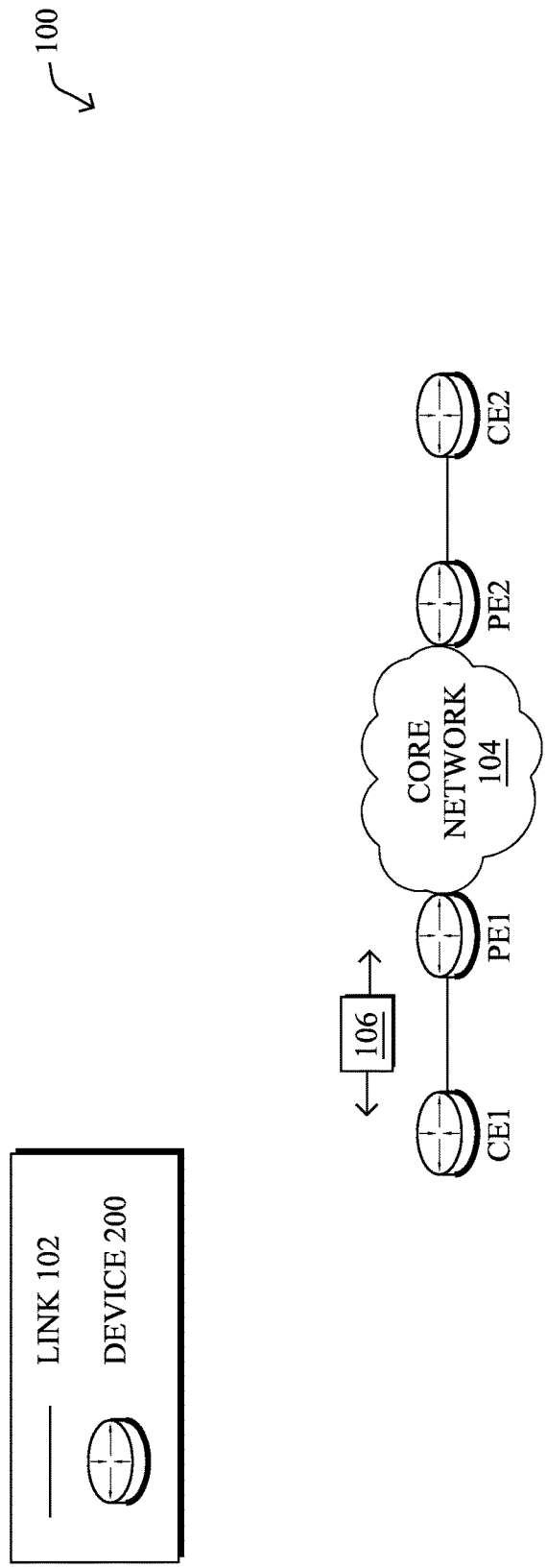
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network 104, such as an illustrative Multi-Protocol Label Switching (MPLS) core network. Data packets 106 (e.g., traffic/messages) may be exchanged among the nodes/devices 200 of the computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
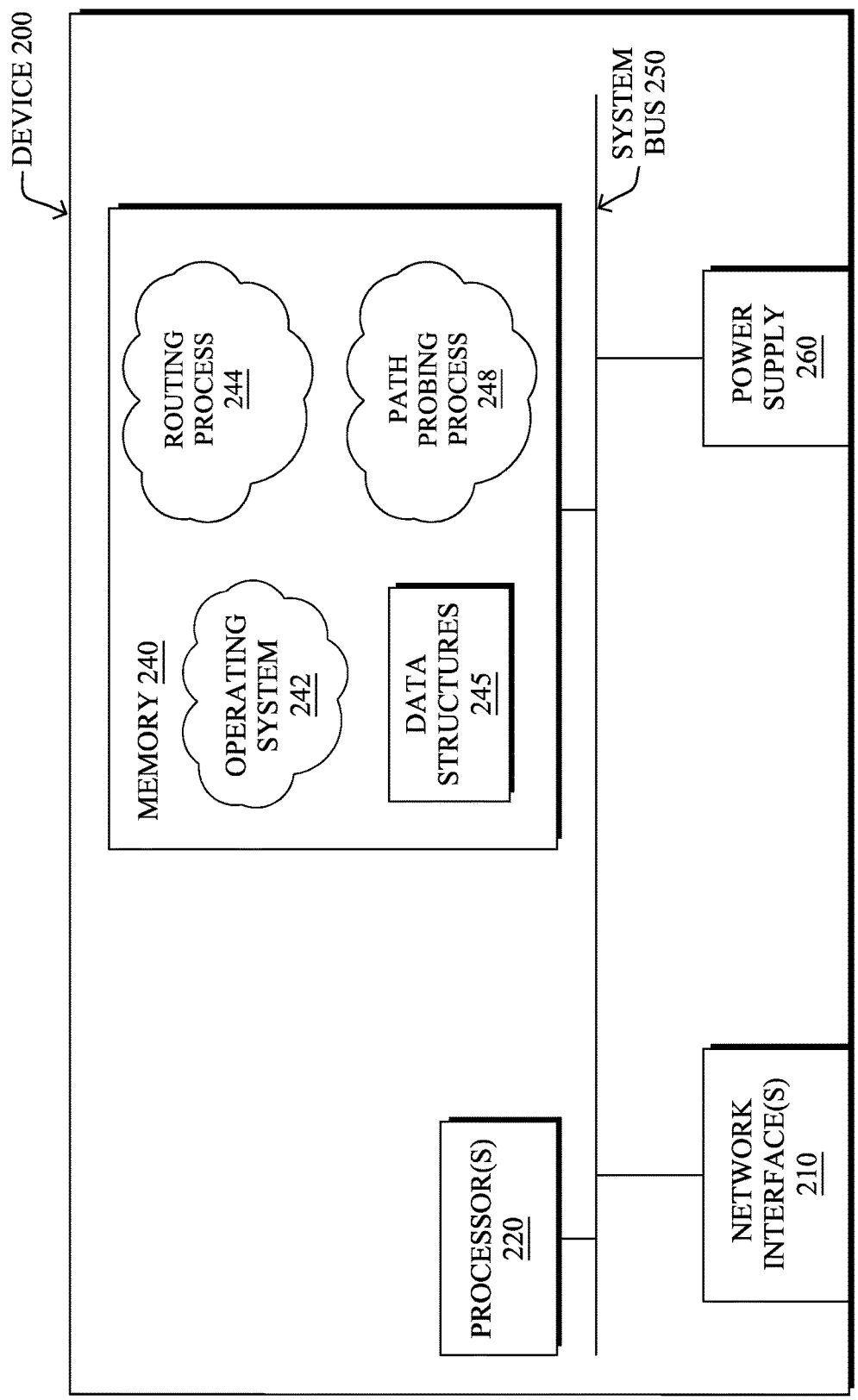
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a path probing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including. e.g., data used to make forwarding decisions. In particular, changes in the network topology may be communicated among devices 200 (e.g., routers) using routing protocols, such as the conventional OSPF and IS-IS link-state protocols (e.g., to "converge" to an identical view of the network topology).

According to further embodiments, routing process 244 may support segment routing. Briefly, segment routing may be enabled in a network through the use of IGP extensions that allow IGP messages to carry label information or via another suitable protocol. Segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with multiprotocol label switching (MPLS), segments (e.g., node and adjacency segments) may be treated as labels, whereby a node may either "push" a new segment/label onto the stack, "pop" (e.g., remove) the top segment/label from the stack, or "swap" the top label of the stack with another label. In addition, segment routing can also be implemented in a similar manner using IPv6 headers to convey the segment information.

As noted above, telecommunication companies, Service Providers (e.g., cloud, ISP, etc.), and enterprises that own and build their own networks are leveraging segment routed networking to provide more granular and efficient packet forwarding in core, metro, access, and 5G/cellular networks. Segment routing allows network operators to explicitly define what path a certain packet should take when being sent from a particular source to a particular destination. Segment routing also provides a powerful mechanism for granular network optimization and application specific traffic engineering, which is one of the primary goals of full stack observability and application centric networking.

In order to fully leverage the potential of segment routing, operators need to understand the end-to-end performance of the potential paths in the network paths that will be used in a segment routed network. They also need to be able to understand the performance of individual hops within a segment routed path so that they can troubleshoot and modify segment routed paths that may be impacting app or service performance.

Existing network probing tools, such as ThousandEyes and the like, can capture end-to-end network performance metrics, as well as hop-by-hop visibility and performance within an IP based network. However, there are two problems with respect to probing segment routed networks. First, these probing tools are based on Internet Protocol (IP) packets and routed using best path or Equal-Cost Multi-Path (ECMP) forwarding. Thus, their synthetic probing packets are limited to measuring only the path chosen by the underlying routes and are unable to probe specific segment routed paths. This prevents them from being able to measure the performance of potential routes, limiting the captured performance measurements to the actual route.

Figure 3:
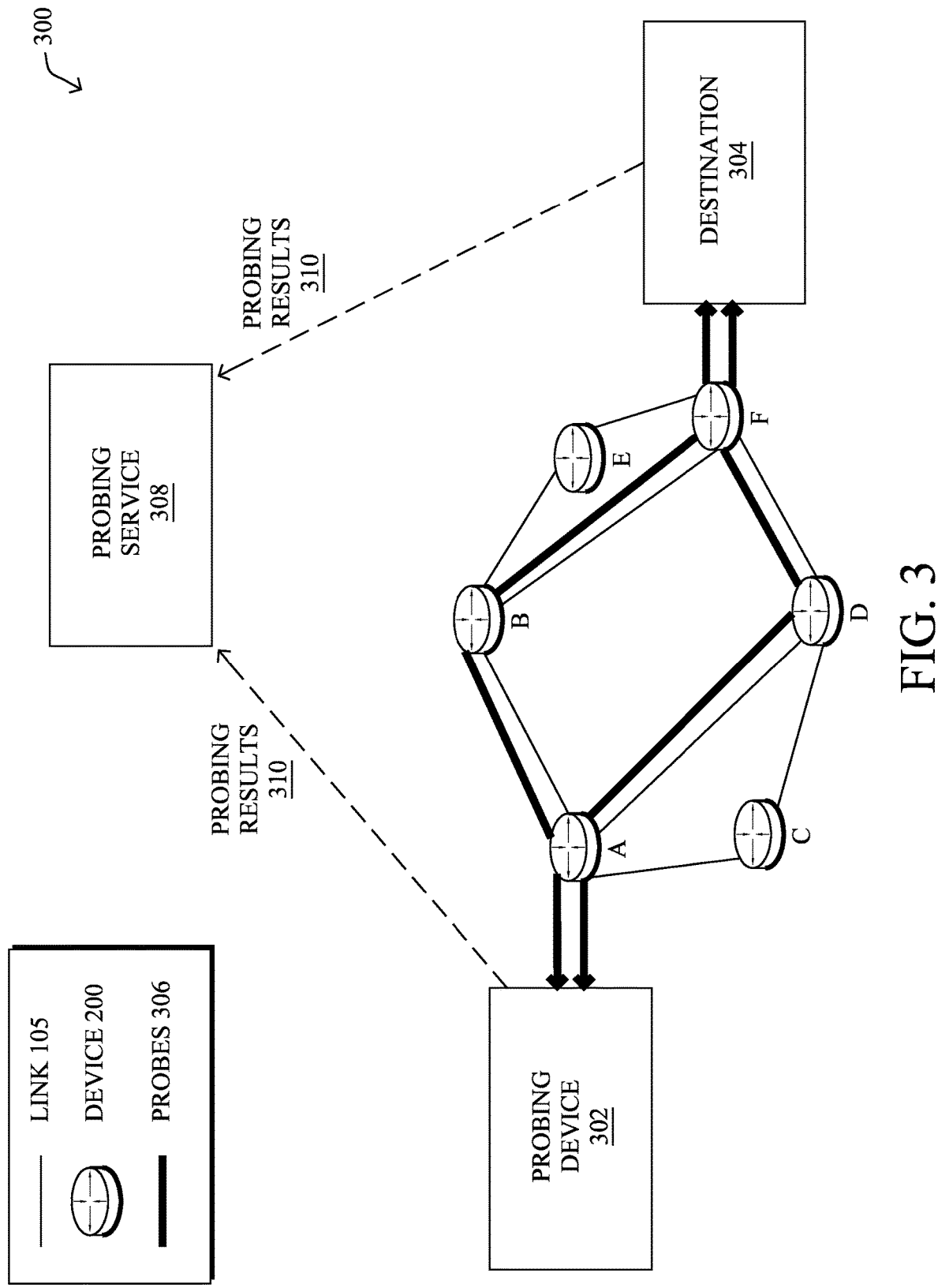
FIG. 3 illustrates an example segment routed network.

By way of example, FIG. 3 illustrates an example segment routed network 300, in various embodiments. Continuing the example of FIG. 1, core network 130 may comprise any or all of segment routed network 300, thereby connecting endpoint devices across different local networks. As shown, assume that segment routed network 300 includes a set of routers 105, denoted routers A-F, and configured to support segment routing. Thus, there may be various paths available in segment routed network 300 between different points.

Now, assume that there is also a probing service 308 (e.g., ThousandEyes, etc.) that oversees the operation of any number of probing agents executed by devices connected to segment routed network 300. For instance, a particular probing device 302 may seek to probe the paths between itself and another device, destination 304, each of which executing its own path probing agent (e.g., path probing process 248), and report the probing results 310 to probing service 308 for reporting For instance, probing service 308 may present probing results 310 for display to a network operator, to a path selection mechanism that seeks to select the 'best' path based on some criteria, or the like.

In the case of the probing agents relying on traditional probing, probing device 302 and destination 304 may exchange synthetic probes 306 as IP packets that are routed according to however the network chooses (e.g., using best path or ECMP, etc.). For instance, as shown, assume that there are installed segment routed segments between routers A-B, B-E, B-F, E-F, A-C, C-D, and D-F. In such a case, probes 306 may be routed between probing device 302 and destination 304 via paths A-D-F, A-B-F, and/or the reverse of these paths, if destination 304 similarly sends probes 306 towards probing device 302. Consequently, probing results 310 will not reflect any path metrics for the other potential paths in segment routed network 300, such as paths A-B-E-F and A-C-D-F. Depending on the circumstances, these paths may even afford better performance than those of the paths currently in use in segment routed network 300.

Secondly, IP-based probing tools also typically use the time-to-live (TTL) IP header and "time to live exceeded" responses from routers to perform network path discovery (e.g., to perform a traceroute). This approach does not work with segment routing, though, because the outbound IP-based packets are encapsulated with segment routing (SR)-MPLS or SR IPv6 (SRv6) headers. Consequently, the tool attempting to perform hop-by-hop discovery of the IP routers using TTL exceeded won't work with Segment Routed networks because with Segment Routing, the outbound IP based packets are encapsulated with SR-MPLS or SRv6 headers. This means that the entire segment routed portion of the network will appear as a single hop tunnel to any tool attempting to perform hop-by-hop discovery of the IP routers using TTL expired. This means that the probing results will lack visibility into the actual paths available in the segment routed network.

Synthetic Path Tracing of Segment Routed Networks

The techniques herein allow for the synthetic path tracing of segment routed networks. In some aspects, the techniques herein may discover the topology of a segment routed network, to identify the different segments available in the network. In further aspects, the techniques herein may also leverage a reverse path probing mechanism using segment routing headers that allows a synthetic network probe to actively probe all segments, as well as identify and measure per-hop metrics. This will allow network operators to actively optimize segment routing-based networks and identify potential issues with individual nodes so that segment routing paths can be modified as needed to maintain desired performance.

Specifically, according to one or more embodiments of the disclosure as described in detail below, a device obtains topology information for a segment routed network. The device generates, based on the topology information, segment routing label stacks to probe different paths between a source and destination in the segment routed network. The device conducts probing of the different paths during which synthetic probe packets are sent via the segment routed network using the segment routing label stacks. The device presents results of the probing of the different paths for display.

Illustratively, the techniques described herein may be performed by hardware, software, and/or firmware, such as in accordance with path probing process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols and, as such, may be processed by similar components understood in the art that execute those protocols, accordingly.

Operationally, the techniques herein allow for the generation of synthetic network probes that provide hop-by-hop visibility of routers and IP links within a segment routed network and to provide a mechanism for explicitly probing specific segment routed network paths for the purpose of evaluating best path performance. To do this, the techniques herein leverage a modified form of trace-routing that is compatible with segment routed networks and does not depend on TTL Expired responses from routers.

Figure 4:
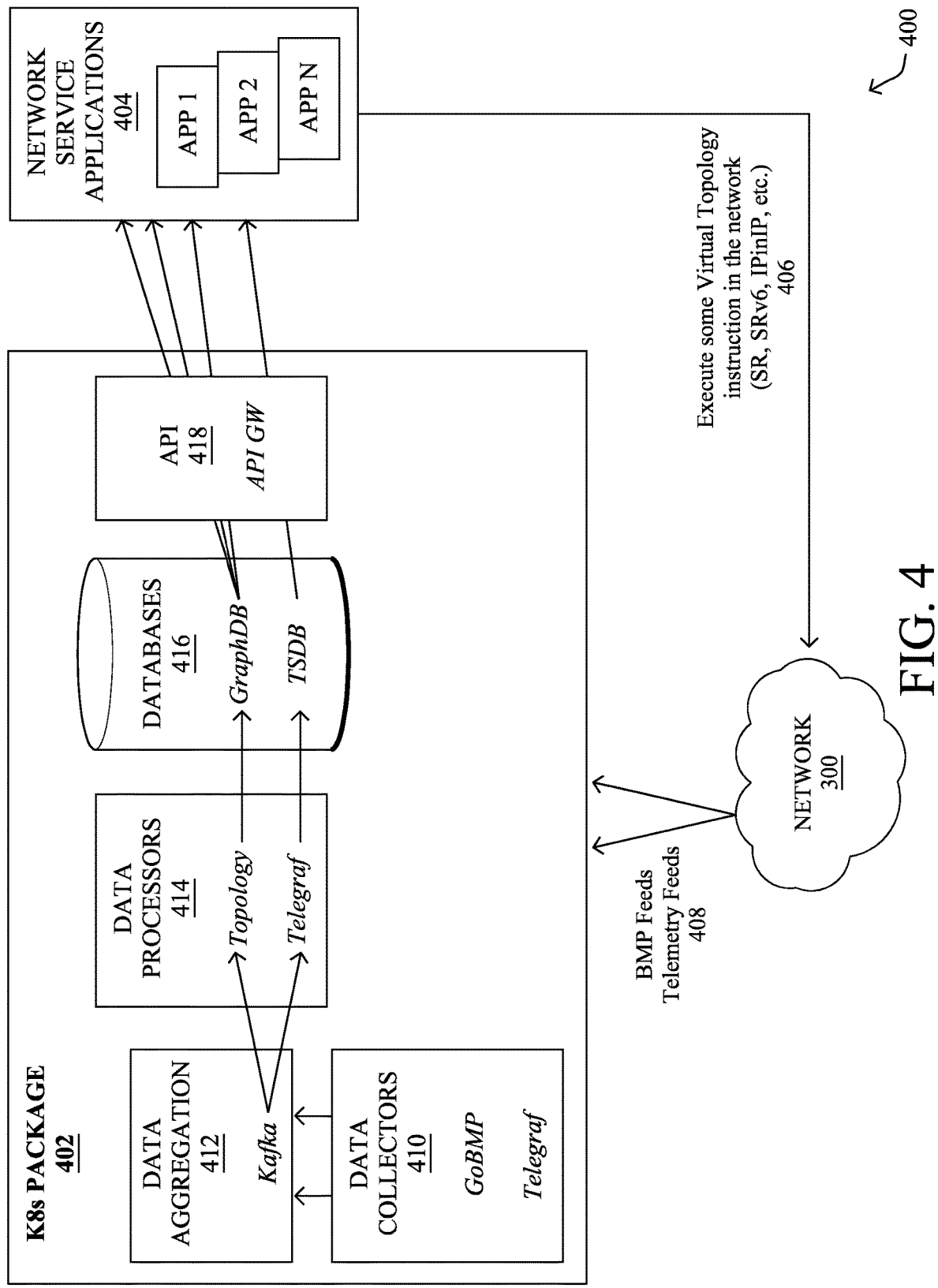
FIG. 4 illustrates an example architecture to determine the topology of a segment routed network.

FIG. 4 illustrates an example architecture for a topology discovery service 400 to determine the topology of a segment routed network, in various embodiments. In general, topology discovery service 400 may be implemented as a software package 402, such as a Kubernetes (K8) package, and discover the topology of a segment routed network based on the Border Gateway Protocol (BGP) Monitoring Protocol (BMP), to build a graph model of the network.

More specifically, topology discovery service 400 operates under the assumption that all software defined networking (SDN) use cases are really virtual topologies whose type and characteristics are driven by data plane encapsulations and other metadata. Thus, SDN is really a database problem. With this framework in mind, topology discovery service 400 has the theoretical ability to address any kind of virtual topology use case, for example:

Internal Traffic Engineering (TE)—engineered tunnels traversing a network under common management, including BGP-LS use cases.

Egress Peer Engineering (EPE)—engineered tunnels sending traffic out a specific egress router/interface to an external network SD-WAN-various combinations of TE and EPE VPN overlays—engineered tunnels creating point-to-point or multipoint overlay virtual networks Network Slicing—see VPN overlays VPN overlays with TE, EPE, SDWAN Service Chaining—engineered tunnels, potentially a series of them, linked together via or seamlessly traversing midpoint service nodes To this end, software package 402 may include data collectors 410 (e.g., GoBMP, Telegraf, etc.) that collect data feeds such as BMP or other telemetry feeds 408 from network 300. In general, BMP provides a superset of topology information, such as the following:

BGP-LS topology data iBGP and eBGP IPv4, IPv6, and labeled unicast topology data BGP VPNv4, VPNv6, and EVPN topology data In turn, data collectors 410 may provide the collected data to data processors 414. Data processors 414 may include, for instance, base data processors that populate one or more databases 416, such as a timeseries database (TSDB) and/or graph database (GraphDB). In addition, data processors 414 may also include virtual topology or edge processors that mine the graph and TSDB data collections and then populate virtual topology edge collections in the graph DB.

Software package 402 may also include an API component 418, such as an API gateway, that exposes the virtual topology data for consumption by any number of network service applications 404. In general, network service applications 404 may be mini-applications that mine the information in databases 416 for the label stack or SRv6 segment routing header (SRH) data needed to execute the topology or traffic engineering use cases. Each application 404 may have its own API to field client requests for segment routing services in segment routed network 300.

By way of example, assume that an end user or application would like send their backup/background traffic to its destination via the least utilized path in segment routed network 300 and, thus, preserve more capacity on the routing protocol's chosen best path. In such a case, software package 402 may respond to the request with a segment routing label stack that, when appended to outbound packets, will steer traffic over the least utilized path by issuing instructions 406 to segment routed network 300. In some instances, a feedback loop can also be used, to identify changes in the least used path and update instructions 406 as needed.

FIGS. 5A-5F illustrate an example of sending synthetic probes along a path in the segment routed network of FIG. 3, according to various embodiments. As shown, assume now that probing service 308 is in communication with topology discovery service 400, described previously with respect to FIG. 4. While these two services are shown separately, it will be appreciated that their functionalities may also be combined into a single service, as desired. Further, while service 400 and service 308 may be provided by multiple devices, in some instances, the executing device(s) may be viewed as a singular device for purposes of the teachings herein.

Figure 5A:
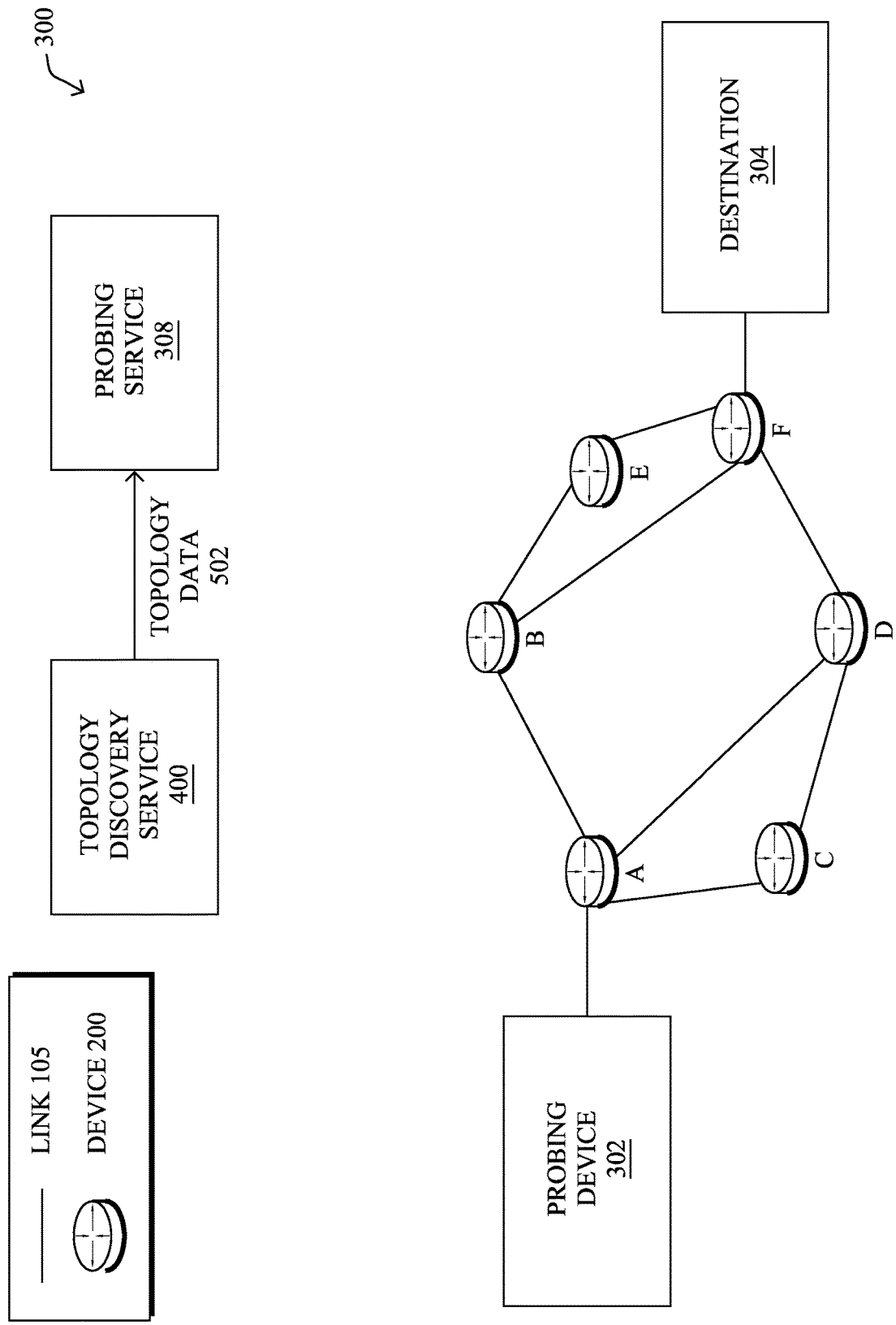
FIGS. 5A-5F illustrate an example of sending synthetic probes along a path in the segment routed network of FIG. 3.

In various implementations, topology discovery service 400 may be augmented to inject appropriate SR/SRv6 SID stacks onto synthetic network probe data generated by probing service 308, in order to explicitly probe specific routes. For instance, once topology discovery service 400 has discovered the segments connecting routers A-F in segment routed network 300, it may provide this topology data 502 to probing service 308, as shown in FIG. 5A. This can be done either on a push basis or on a pull basis, whereby probing service 308 first requests topology data 502 for a set of paths between two locations, such as between probing device 302 and destination 304. In turn, topology discovery service 400 may return the SID stacks for all of the paths between these two locations.

Figure 5B:
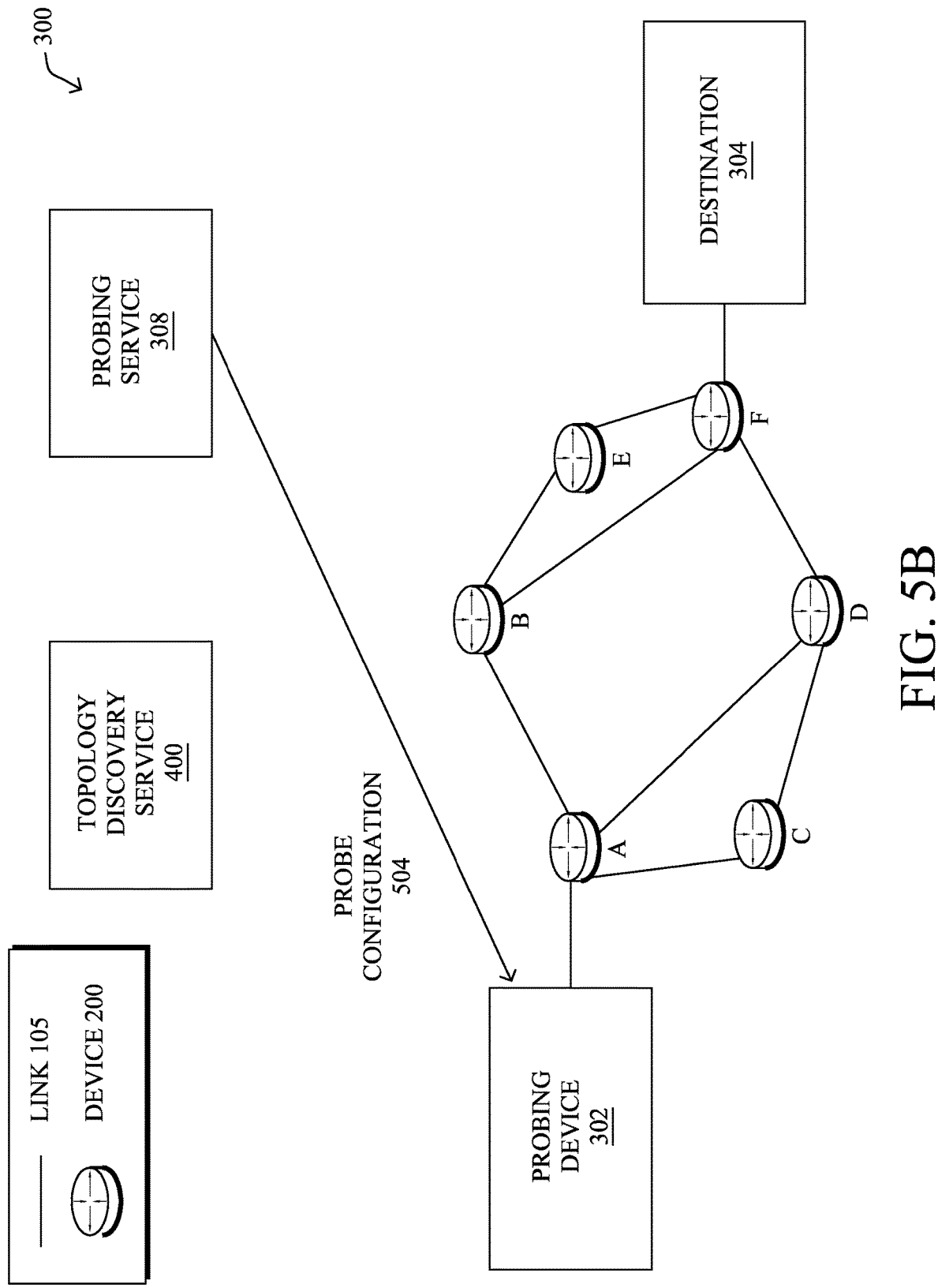
Figure 5C:
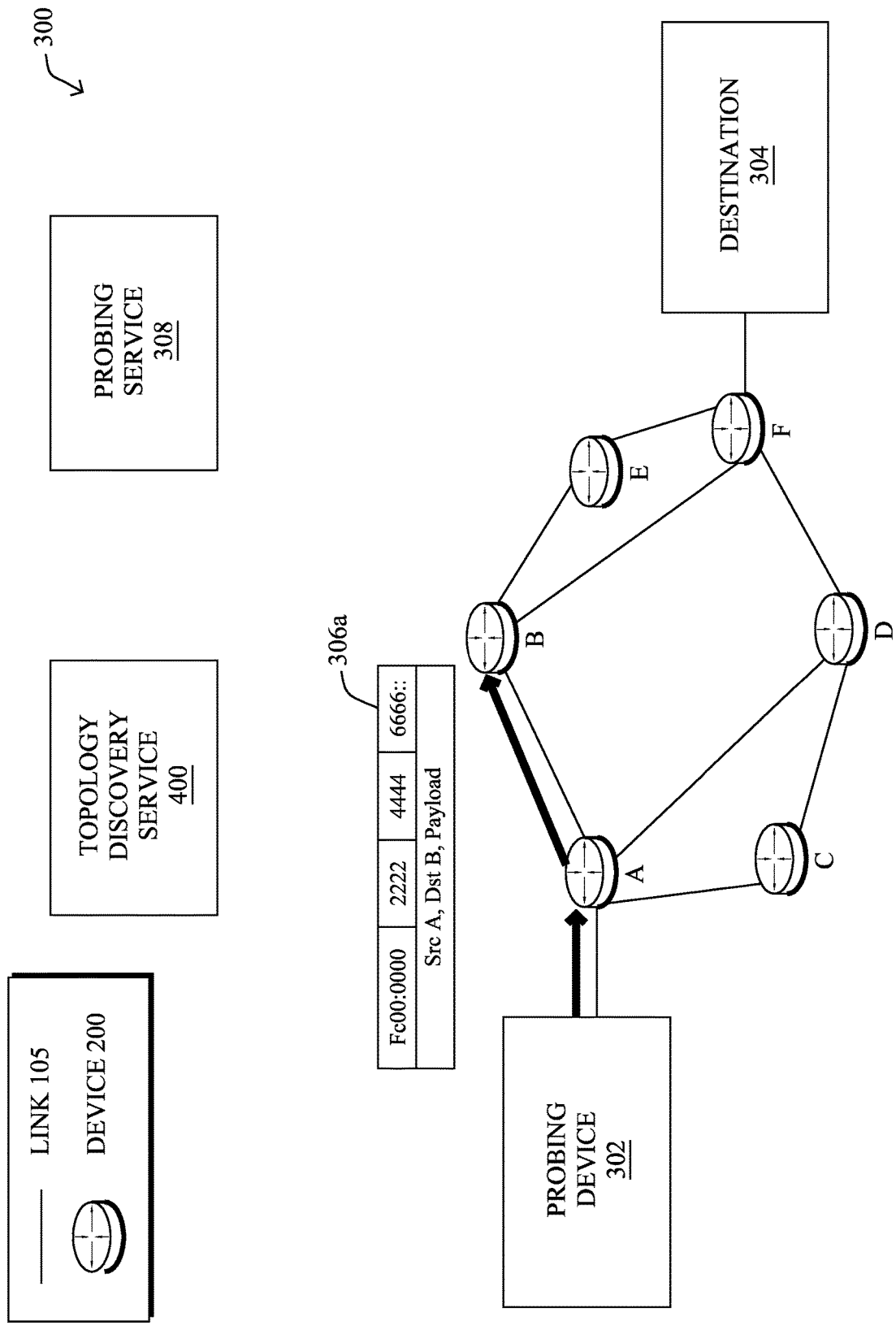

Then, as shown in FIG. 5B, probing service 308 may send a probing configuration 504 to probing device 302 that includes the appropriate SID stack instructions in order for probing device 302 to probe the different paths. In the case of the reverse path and destination 304 also executing its own probing agent, probing service 308 may send similar corresponding configuration information to it, as well.

Said differently, topology discovery service 400 may first build the network topology of a segment routed network, such as segment routed network 300, based on BMP emitted data. In turn, probing service 308 may then leverage this information to generate SR or SRv6 SID stacks such that, when applied to synthetic network probes, the packets will traverse a pre-determined path in the segment routed network. Each packet of a synthetic probe may be encapsulated with a set of SR prefix segment identifiers (SIDs), each corresponding to a "router number+100000," for example. The "list" of routers that represent that path the packet should take can then be built as a stack of these SID prefixes on the encapsulated synthetic probe packet. Probing service 308 can do this for any or all of the possible segment routed paths in segment routed network 300, allowing it to collect performance metrics for all of these paths, not just ECMP best paths.

In turn, probing service 308 may then build a combined topology/performance graph and path information available to a client application, system, user, or other endpoint, and allow the client to select or construct an optimized transport solution, which may or may not take the routing protocol's chosen best-path, to meet its specific application service level agreement (SLA) requirements. Using a synthetic network probing mechanism, like Cisco ThousandEyes, the topology/performance graph could also be augmented with application-specific performance data and/or other specific service types, e.g., DSCP settings, etc., in some instances.

By way of example, probing device 302 may then send a synthetic probe packet 306a to router A with SRv6 uSID encapsulated. Here, assume that probing device 302 corresponds to a source A ("Src A") and destination 304 corresponds to a destination B ("Dst B"). In addition, assume that the header of packet 306a include segment routing labels that correspond to routers B (e.g., '2222'), E (e.g., '4444'), and F (e.g., '6666'). In turn, router A may forward packet 306a onward to router B without modifying the uSID.

Figure 5D:
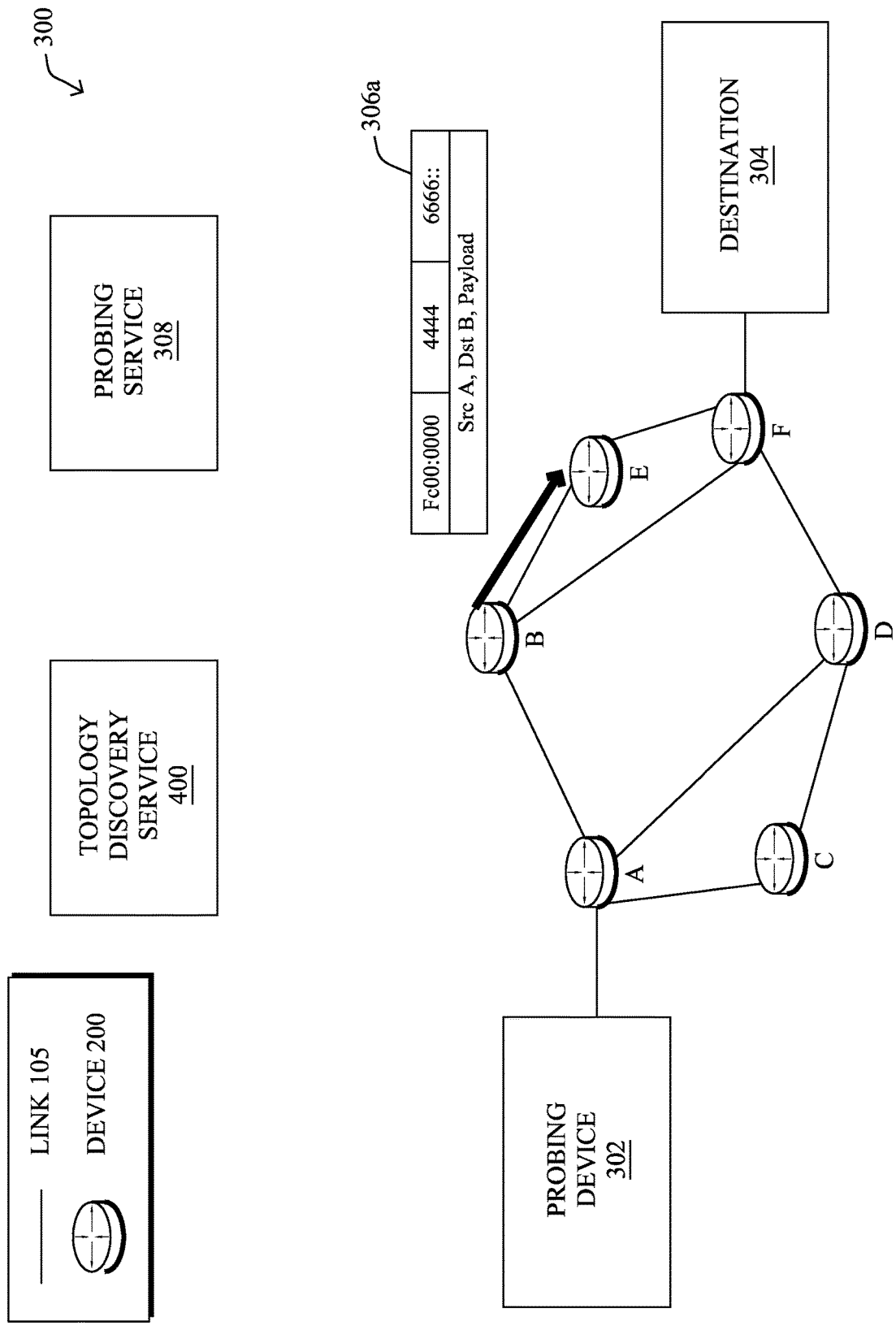
Figure 5E:
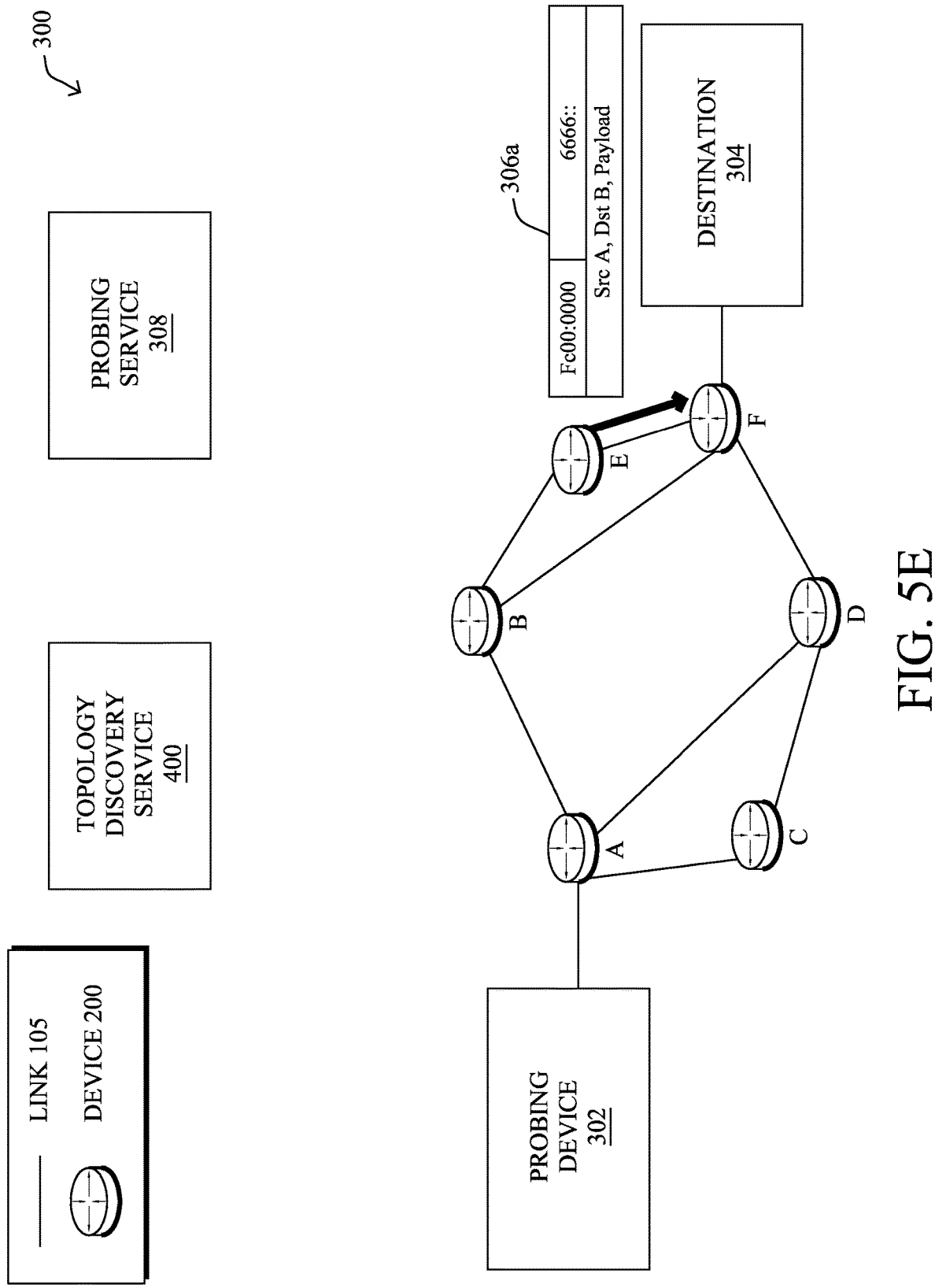
Figure 5F:
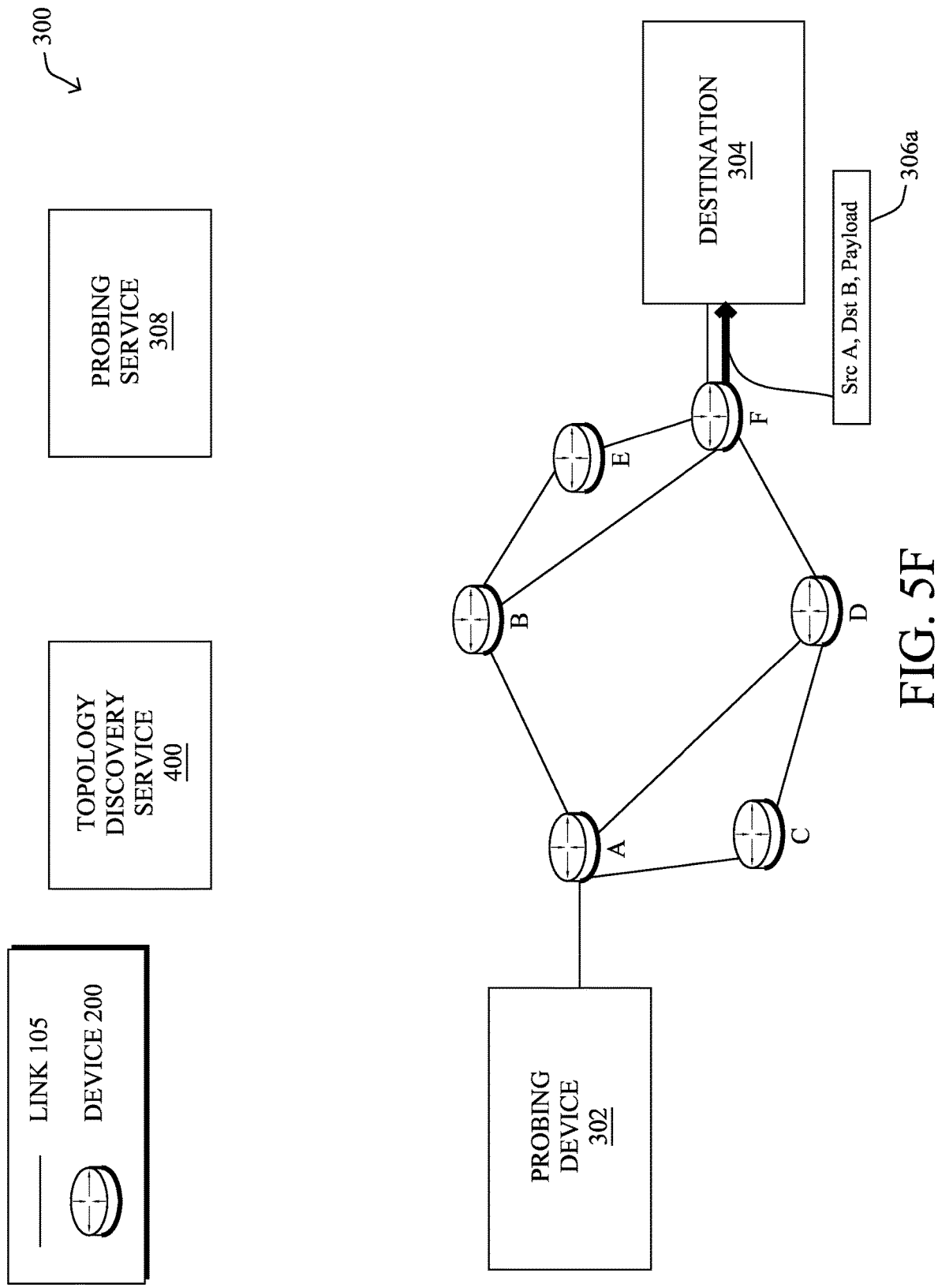

As shown in FIG. 5D, router B may process synthetic probe packet 306a and its SRv6 uSID, removing the label associated with router B, and forwarding the packet on to router E. In FIG. 5E, router E may perform a similar function, removing its own label from the header of packet 306a and forwarding it on to router F. Finally, as shown in FIG. 5F, router F may process packet 306a, removing its SRv6 header, and forwarding it on to destination 304.

Thus, using the above approach, probing service 308 is able to probe the performance metrics for the patch comprising routers A, B, E, and F within segment routed network 300, even though the routing functions in segment routed network 300 would not normally select that path to route traffic. The resulting probing results 310 that probing device 302 and/or destination 304 report back to probing service 308 may thus be indicative of the latency along this path, although they may also indicate other path metrics as well, such as jitter or loss.

While the above approach provides a mechanism for measuring the performance of explicit segment routing path segments, it is also possible that this approach may not achieve the granularity of hop-by-hop path metrics. Indeed, segment routing involves "tunneling" the probes via SR or SRv6 SID stacks, meaning that the resulting path metrics will be on a per-segment basis, not on a per-hop basis, as segments may comprise multiple hops, in some instances.

Figure 6:
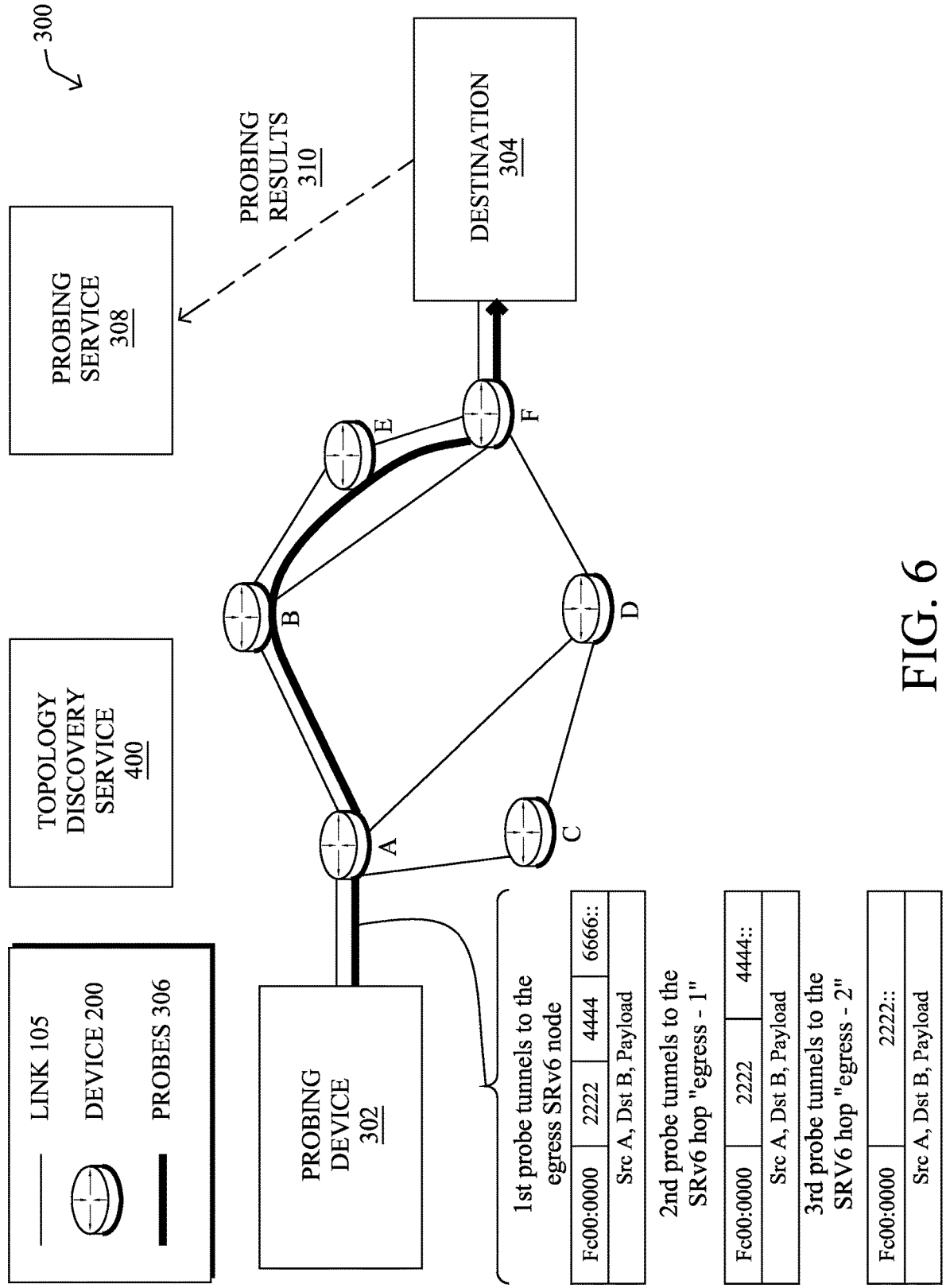
FIG. 6 illustrates an example of sending reverse traceroute probes along a path in the segment routed network of FIG. 3.

Thus, if the network operator desires hop-by-hop metrics, probing service 308 may also employ what is referred to herein as a "reverse traceroute" approach that is able to collect hop-by-hop path metrics, in further implementations. By way of example, FIG. 6 illustrates an example of sending reverse traceroute probes along a path in the segment routed network of FIG. 3. Here, the probing mechanism may still encapsulate synthetic network probes 306 with SID stacks in an SRv6 header, in order to steer those packets onto the correct paths. For example, as in the above case, a test probe to trace the path from Src A (e.g., probing device 302) to Dest B (e.g., destination 304) via routers A, B, E, and F, may be encapsulated with an SRv6 SID stack of "Fc00:0000, 2222, 4444, 6666" (example SRv6 Micro-SID Option). Doing so, as in the above case, will measure the end-to-end performance across the entire set of segments along routers A, B, E, and F.

A key observation herein is that routers that support segment routing will continue to forward packets onwards towards their ultimate destinations, even if the end of a segment routed path has been reached. More specifically, if any given router is the last router indicated by the segment routing stack in the header of the packet, that router will then forward the packet onward towards its destination using normal best path/IP routing, for instance. This means that from that point onward, the probe packet will capture hop-by-hop metrics until it reaches its destination, even if probing service 308 does not have explicit knowledge of each hop along the way.

Accordingly, as shown in FIG. 6, to perform the reverse traceroute probing of the path comprising routers A, B, E, and F, probing service 308 may conduct probing of that path by having probing device 302 send a series of probes 306, each having different SRv6 SID stacks corresponding to different segment routing egress points. For instance, as shown, probing device 302 may send a series of probes 306, starting with a probe that targets router F as its segment routing egress point, and then probes that decrement the target egress point along the path.

More specifically, as shown, the first probe 306 may include labels that ensure that the probe is sent by router A via segment routing through routers B, E, and F, by including labels "2222," "4444" and "6666," in its SRv6 SID header, accordingly. Then, for the next probe 306, probing device 302 may include only labels for "2222" and "4444" in its SRv6 SID header. By doing so, the that probe will only be conveyed via segment routing to router E (e.g., hop "egress−1" relative to the full path), at which point router E will forward the packet onward towards destination 304 using standard best path/IP routing. Similarly, probing device 302 may also send a third probe 306 having an SRv6 SID header with only a label of "2222" that corresponds to router B, at which point router B will forward the packet onward towards destination 304 using standard best path/IP routing.

On receipt of each of the probes 306 that probing device 302 sends, destination 304 may then provide the resulting probing results 310 back to probing service 308. To aggregate these metrics, the various probes and resulting probing results 310 may each be associated with a correlation identifier (correlationID), thereby allowing probing service 308 to aggregate the probing results 310 for the different probes 306 into a complete set of measurements of the path comprising routers A, B, E, and F, including granularity down to the per-hop level.

By way of example, for the probing shown in FIG. 6, the probing results 310 that result from probing service 308 using the reverse traceroute approach may appear similar to the following:

TABLE 1

| Data set 1 | Probing device 302 to destination 304 | Latency L1 |
| Data set 2 | Probing device 302 to router F | Latency L2 |
| Data set 3 | Probing device 302 to router E | Latency L3 |
| Data set 4 | Probing device 302 to router B | Latency L4 |
| Data set 5 | Probing device 302 to router A | Latency L5 |

In turn, probing service 308 may use the correlationId to aggregate these results into more detailed metrics regarding the path. For instance, probing service 308 may calculate, based on the differences between each incremental test, the performance for each router/segment of the path. For instance, probing service 308 may compute the latency between router B and router E as L3−L4. Probing service 308 may then provide data for display that shows a visual representation of the path, including each SR router node and calculated path latency.

As would be appreciated, in addition to latency, since the reverse traceroute approach relies on running explicit synthetic network tests to each node in the segment routed network path, the probing system is not limited to gathering just latency metrics, but could also be used to measure jitter and/or loss to each node, as well.

In the scenario where the probing system is unable to perform a synthetic network test to a specific router, the system could still leverage SID to perform a "loopback path-trace" in which the specified segment routed path traverses to a target router, then back to the source on the same path. This would require building the entire forward path and reverse path in the SID stack. For example, in the case of FIG. 6, if a TCP connection cannot be established directly to router F, probing service 308 may instead build a path from probing device 302 to router F and then back to probing device 302, in which case the SID stack for the probe 306 might look like: "Fc00:0000, 2222, 4444, 6666, 4444, 2222, 0000." In this way, probing service 308 could use a modified form of the iterative reverse traceroute approach described previously, to still calculate the hop-by-hop performance of a path (e.g., by issuing a series of synthetic probes 306 with probes 306 as both the source and destination and egressing the segment routing path at different routers).

Figure 7:
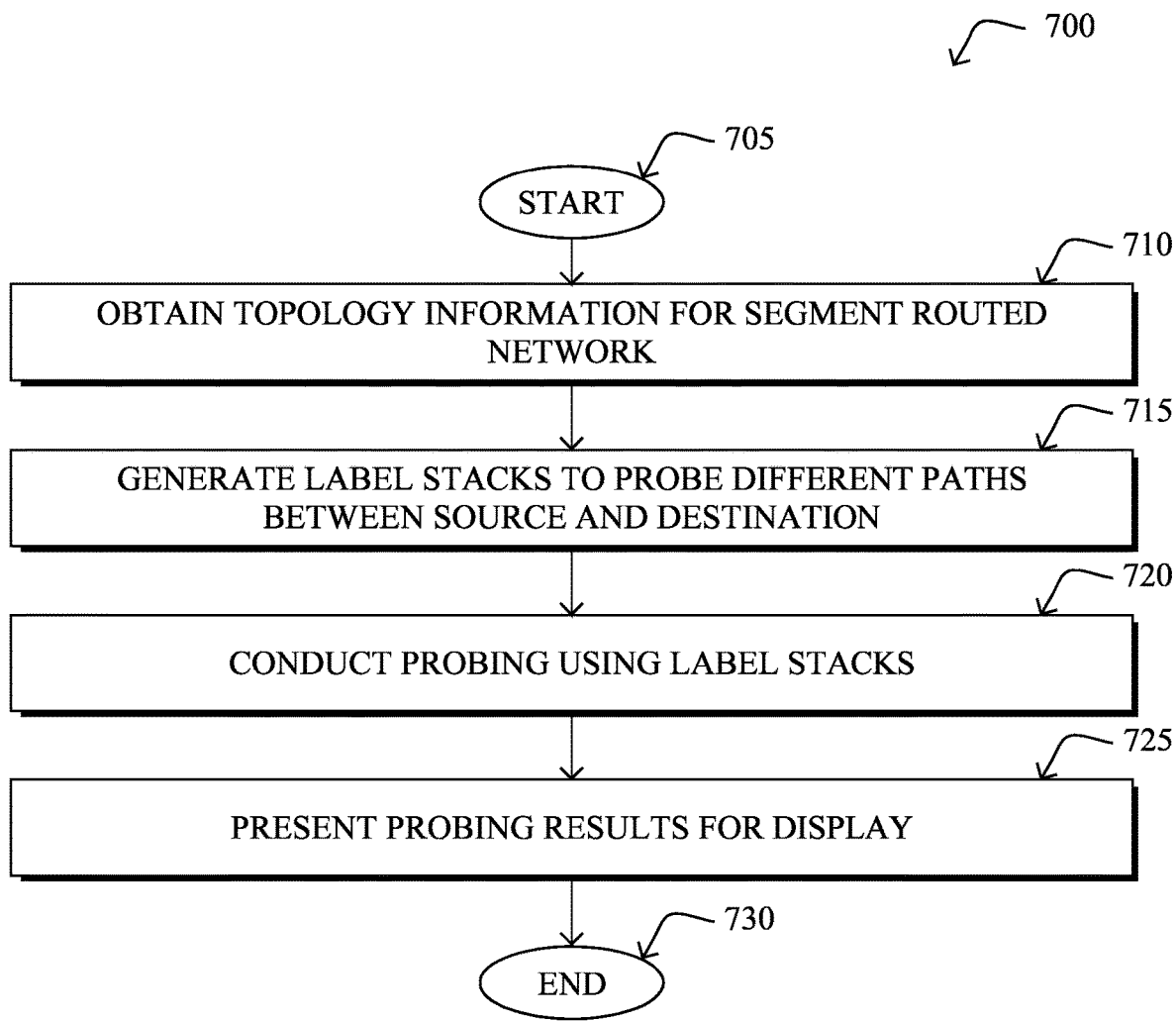
FIG. 7 illustrates an example simplified procedure for performing synthetic path tracing of segment routed networks.

FIG. 7 illustrates an example simplified procedure for performing synthetic path tracing of segment routed networks, in accordance with one or more embodiments described herein. In general, procedure 700 may be performed by any non-generic, specialized device by executing specialized instructions (e.g., process 248). The procedure 700 may start at step 705, and continues to step 710, where, as described in greater detail above, the device may obtain topology information for a segment routed network. In various instances, the topology information is obtained based on Border Gateway Protocol (BGP) Monitoring Protocol information from the segment routed network.

At step 715, as detailed above, the device may generate, based on the topology information, segment routing label stacks to probe different paths between a source and destination in the segment routed network. In one instance, one of the segment routing label stacks comprises labels that direct one of the synthetic probe packets from an initial router in the segment routed network towards a particular router and back to the initial router. In some cases, the different paths comprise at least one path that is not chosen by a routing protocol to route user traffic. In various implementations, the segment routing label stacks comprise segment routing Multi-Protocol Label Switching (SR-MPLS) or segment routing Internet Protocol version 6 (SRv6) segment identifiers (SIDs).

At step 720, the device may conduct probing of the different paths during which synthetic probe packets are sent via the segment routed network using the segment routing label stacks, as described in greater detail above. In some instances, the probing measures at least one of: latency, loss, or jitter along the different paths. In further instances, the synthetic probe packets sent over a particular path among the different paths comprise segment routing label stacks that target different routers along that path. In some cases, the device may also aggregate results of the synthetic probe packets for the particular path. In one instance, the results are aggregated based on a correlation identifier associated with the synthetic probe packets. In another instance, a targeted router along the particular path sends at least one of the synthetic probe packets using Internet Protocol routing towards the destination.

At step 725, as detailed above, the device may present results of the probing of the different paths for display. In some cases, the device may also provide the results of the probing to a path selection service.

Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for synthetic path tracing of segment routed networks, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
obtaining, by a device, topology information for a segment routed network;
generating, by the device and based on the topology information, segment routing label stacks to probe different paths between a source and destination in the segment routed network;
conducting, by the device, probing of the different paths during which synthetic probe packets are sent via the segment routed network using the segment routing label stacks; and
presenting, by the device, results of the probing of the different paths for display.

2. The method as in claim 1, wherein the synthetic probe packets sent over a particular path among the different paths comprise segment routing label stacks that target different routers along that path.

3. The method of claim 2, further comprising:
aggregating results of the synthetic probe packets for the particular path.

4. The method as in claim 3, wherein the results are aggregated based on a correlation identifier associated with the synthetic probe packets.

5. The method as in claim 2, wherein a targeted router along the particular path sends at least one of the synthetic probe packets using Internet Protocol routing towards the destination.

6. The method as in claim 1, wherein the topology information is obtained based on Border Gateway Protocol (BGP) Monitoring Protocol information from the segment routed network.

7. The method as in claim 1, wherein the probing measures at least one of: latency, loss, or jitter along the different paths.

8. The method as in claim 1, wherein one of the segment routing label stacks comprises labels that direct one of the synthetic probe packets from an initial router in the segment routed network towards a particular router and back to the initial router.

9. The method as in claim 1, wherein the different paths comprise at least one path that is not chosen by a routing protocol to route user traffic.

10. The method as in claim 1, wherein the segment routing label stacks comprise segment routing Multi-Protocol Label Switching (SR-MPLS) or segment routing Internet Protocol version 6 (SRv6) segment identifiers (SIDs).

11. An apparatus, comprising:
one or more network interfaces;
a processor coupled to the one or more network interfaces and configured to execute one or more processes; and
a memory configured to store a process that is executable by the processor, the process when executed configured to:
obtain topology information for a segment routed network;
generate, based on the topology information, segment routing label stacks to probe different paths between a source and destination in the segment routed network;
conduct probing of the different paths during which synthetic probe packets are sent via the segment routed network using the segment routing label stacks; and
present results of the probing of the different paths for display.

12. The apparatus as in claim 11, wherein the synthetic probe packets sent over a particular path among the different paths comprise segment routing label stacks that target different routers along that path.

13. The apparatus of claim 12, wherein the process when executed is further configured to:
aggregate results of the synthetic probe packets for the particular path.

14. The apparatus as in claim 13, wherein results of the probing of the different paths are aggregated based on a correlation identifier associated with the synthetic probe packets.

15. The apparatus as in claim 12, wherein a targeted router along the particular path sends at least one of the synthetic probe packets using Internet Protocol routing towards the destination.

16. The apparatus as in claim 11, wherein the topology information is obtained based on Border Gateway Protocol (BGP) Monitoring Protocol information from the segment routed network.

17. The apparatus as in claim 11, wherein the probing measures at least one of: latency, loss, or jitter along the different paths.

18. The apparatus as in claim 11, wherein one of the segment routing label stacks comprises labels that direct one of the synthetic probe packets from an initial router in the segment routed network towards a particular router and back to the initial router.

19. The apparatus as in claim 11, wherein the different paths comprise at least one path that is not chosen by a routing protocol to route user traffic.

20. A tangible, non-transitory, computer-readable medium storing program instructions that cause a device to execute a process comprising:
obtaining, by a device, topology information for a segment routed network;
generating, by the device and based on the topology information, segment routing label stacks to probe different paths between a source and destination in the segment routed network;

conducting, by the device, probing of the different paths during which synthetic probe packets are sent via the segment routed network using the segment routing label stacks; and presenting, by the device, results of the probing of the different paths for display.

\* \* \* \* \*